United States Patent
Smith et al.

(10) Patent No.: US 7,096,353 B2
(45) Date of Patent: *Aug. 22, 2006

(54) SOFTWARE MODEM WITH PRIVILEGED MODE DECRYPTION OF CONTROL CODES

(75) Inventors: David W. Smith, Cedar Park, TX (US); Brian C. Barnes, Round Rock, TX (US); Terry L. Cole, Austin, TX (US); Rodney Schmidt, Austin, TX (US); Geoffrey S. Strongin, Austin, TX (US); Michael Barclay, Swallowcliffe (GB)

(73) Assignee: Advanced Micro Devices, Inc., Austin, TX (US)

( * ) Notice: Subject to any disclaimer, the term of this patent is extended or adjusted under 35 U.S.C. 154(b) by 777 days.

This patent is subject to a terminal disclaimer.

(21) Appl. No.: 09/901,520

(22) Filed: Jul. 9, 2001

(65) Prior Publication Data

US 2003/0009679 A1    Jan. 9, 2003

(51) Int. Cl.
*H04L 9/00* (2006.01)

(52) U.S. Cl. .......... 713/152; 713/189; 713/194; 726/6; 380/266

(58) Field of Classification Search .......... 713/152, 713/200, 201, 207
See application file for complete search history.

(56) References Cited

U.S. PATENT DOCUMENTS

| | | | | |
|---|---|---|---|---|
| 5,363,449 A | * | 11/1994 | Bestock | 705/72 |
| 5,724,426 A | * | 3/1998 | Rosenow et al. | 713/167 |
| 5,784,633 A | * | 7/1998 | Petty | 710/60 |
| 5,925,109 A | | 7/1999 | Bartz | 710/14 |
| 5,925,114 A | | 7/1999 | Hoang | 710/48 |
| 5,978,481 A | * | 11/1999 | Ganesan et al. | 380/266 |
| 5,987,572 A | * | 11/1999 | Weidner et al. | 711/155 |
| 6,212,360 B1 | * | 4/2001 | Fleming et al. | 455/13.4 |
| 6,510,521 B1 | * | 1/2003 | Albrecht et al. | 713/193 |
| 6,549,568 B1 | * | 4/2003 | Bingel | 375/222 |
| 6,650,624 B1 | * | 11/2003 | Quigley et al. | 370/252 |
| 6,973,566 B1 | * | 12/2005 | Smith et al. | 713/151 |
| 6,986,059 B1 | * | 1/2006 | England et al. | 705/51 |
| 2004/0181811 A1 | * | 9/2004 | Rakib | 725/122 |

(Continued)

FOREIGN PATENT DOCUMENTS

WO    WO 99/45694    9/1999

(Continued)

OTHER PUBLICATIONS

Sadiku et al, Cable Modem Technology, 2000, IEEE, pp. 26-27.*

(Continued)

*Primary Examiner*—Christopher Revak
*Assistant Examiner*—Aravind K Moorthy
(74) *Attorney, Agent, or Firm*—Williams, Morgan & Amerson (57) ABSTRACT

A communications system includes a physical layer hardware unit and a processing unit. The physical layer hardware unit is adapted to communicate data over a communications channel in accordance with assigned transmission parameters and receive an incoming signal over the communications channel and sample the incoming signal to generate a digital received signal. The processing unit is adapted to execute a standard mode driver in a standard mode of operation and a privileged mode driver in a privileged mode of operation. The standard mode driver includes program instructions adapted to extract encrypted data from the digital received signal and pass the encrypted data to the privileged mode driver. The privileged mode driver includes program instructions adapted to decrypt the encrypted data to generate decrypted data including control codes and transfer the control codes to the physical layer hardware unit.

25 Claims, 4 Drawing Sheets

U.S. PATENT DOCUMENTS

2005/0141558 A1* 6/2005 Connors ..................... 370/469

FOREIGN PATENT DOCUMENTS

| WO | WO 00/16534 | 3/2000 |
| WO | WO 01/86434 | 11/2001 |

OTHER PUBLICATIONS

McLoone et al, A Single-Chip IPSEC Cryptographic Processor, 2002, IEEE, pp. 133-138.*

Cahill et al, A Channel Access Protocol for Tactical IP Networks using Software Defined VHF Radios, 2002, IEEE, pp. 363-368.*

Farrow, Rik, Critical Infrastructure and You, 2002, Network Magazine, pp. 66 and 68.*

Bruce Schneier, Applied Cryptography, 1996, John Wiley & Sons, Inc., Second Edition, pp. 1-4.*

International Search Report dated Oct. 7, 2002 (PCT/US02/18858; TT4049-PCT).

* cited by examiner

SOFTWARE MODEM WITH PRIVILEGED MODE DECRYPTION OF CONTROL CODES

BACKGROUND OF THE INVENTION

1. Field of the Invention

This invention relates generally to modem communications and, more particularly, to a software modem with privileged mode decryption of control codes.

2. Description of the Related Art

In recent years cellular telephones have become increasingly popular. A cellular telephone is one example of what is referred to as a "mobile station" or "mobile terminal." A mobile station can take on various forms other than a cellular telephone, including a computer (e.g., a notebook computer) with mobile communication capabilities.

Telecommunications services are provided between a cellular telecommunications network and a mobile station over an air interface, e.g., over radio frequencies. Typically, each subscriber having a mobile station is assigned a unique International Mobile Subscriber Identity (IMSI). At any moment, an active mobile station may be in communication over the air interface with one or more base stations. The base stations are, in turn, managed by base station controllers, also known as radio network controllers. A base station controller together with its base stations comprise a base station system. The base station controllers of a base station system are connected via control nodes to a core telecommunications network, such as the publicly switched telephone network (PSTN). One type of standardized mobile telecommunications scheme is the Global System for Mobile communications (GSM). GSM includes standards that specify functions and interfaces for various types of services. GSM systems may be used for transmitting both voice and data signals.

A particular base station may be shared among multiple mobile stations. Because the radio spectrum is a limited resource, the bandwidth is divided using combination of Time-Division and Frequency-Division Multiple Access (TDMA/FDMA). FDMA involves dividing the maximum frequency bandwidth (e.g., 25 MHz) into 124 carrier frequencies spaced 200 kHz apart. A particular base station may be assigned one or more carrier frequencies. Each carrier frequency is, in turn, divided into time slots. During an active session between the base station and the mobile station, the base station assigns the mobile unit a frequency, a power level, and a time slot for upstream transmissions from the mobile station to the base station. The base station also communicates a particular frequency and time slot for downstream transmissions from the base station destined for the mobile station.

The fundamental unit of time defined in GSM is referred to as a burst period, which lasts 15/26 ms (or approx. 0.577 ms). Eight burst periods are grouped into a TDMA frame (120/26 ms, or approx. 4.615 ms), which is the basic unit for the definition of logical channels. One physical channel is defined as one burst period per frame. Individual channels are defined by the number and position of their corresponding burst periods.

GSM frames, each frame having 8 burst periods, are grouped into superframes (e.g., groups of 51 frames) that include both traffic (i.e., voice or data signals) and control information. The control information is conveyed over common channels defined in the superframe structure. Common channels can be accessed both by idle mode and dedicated mode mobile stations. The common channels are used by idle mode mobile stations to exchange signaling information for changing to dedicated mode in response to incoming or outgoing calls. Mobile stations already in the dedicated mode monitor the surrounding base stations for handover and other information.

The common channels include:
- a Broadcast Control Channel (BCCH) used to continually broadcasts information including the base station identity, frequency allocations, and frequency-hopping sequences;
- a Frequency Correction Channel (FCCH) and Synchronization Channel (SCH) used to synchronize the mobile station to the time slot structure of a cell by defining the boundaries of burst periods, and the time slot numbering (i.e., every cell in a GSM network broadcasts exactly one FCCH and one SCH, which are, by definition, sent on time slot number 0 within a TDMA frame);
- a Random Access Channel (RACH) used by the mobile station to request access to the network;
- a Paging Channel (PCH) used to alert the mobile station of an incoming call; and
- an Access Grant Channel (AGCH) used to allocate a Stand-alone Dedicated Control Channel (SDCCH) to a mobile station for signaling (i.e., to obtain a dedicated channel) following a request on the RACH.

For security reasons, GSM data is transmitted in an encrypted form. Because a wireless medium can be accessed by anyone, authentication is a significant element of a mobile network. Authentication involves both the mobile station and the base station. A Subscriber Identification Module (SIM) card is installed in each mobile station. Each subscriber is assigned a secret key. One copy of the secret key is stored in the SIM card, and another copy is stored in a protected database on the communications network that may be accessed by the base station. During an authentication event, the base station generates a random number that it sends to the mobile station. The mobile station uses a random number, in conjunction with the secret key and a ciphering algorithm (e.g., A3), to generate a signed response that is sent back to the base station. If the signed response sent by the mobile station matches the one calculated by network, the subscriber is authenticated. The base station encrypts data transmitted to the mobile station using the secret key. Similarly, the mobile station encrypts data it transmits to the base station using the secret key. After a transmission received by the mobile station is decrypted, various control information, including the assigned power level, frequency, and time slot for a particular mobile station may be determined by the mobile station.

Generally, communication systems are described in terms of layers. The first layer, responsible for the actual transmission of a data carrying signal across the transmission medium, is referred to as the physical layer (PHY). The physical layer groups digital data and generates a modulated waveform based on the data in accordance with the particular transmission scheme. In GSM, the physical layer generates the transmission waveform and transmits during the assigned transmit time slot of the mobile station. Similarly, the receiving portion of the physical layer identifies data destined for the mobile station during the assigned receipt time slot.

The second layer, referred to as a protocol layer, processes digital data received by the physical layer to identify information contained therein. For example, in a GSM system, decryption of the data is a protocol layer function. Notice that changes in the operating parameters of the physical layer are identified only after decryption and processing by the protocol layer. Although this particular interdependency does not generally cause a problem in a purely hardware implementation, it may cause a problem when all or portions of the protocol layer are implemented in software.

Certain computer systems, especially portable notebook computers, may be equipped with wireless modems. One trend in modem technology involves the use of software modems that implement some of the real-time functions of traditional hardware modems using software routines. Because the hardware complexity of a software modem is less than a hardware counterpart, it is generally less expensive as well as more flexible. For example, the protocol layer decryption and processing may be implemented partially or entirely with software.

Software systems, such as PC systems, run interface control software in operating systems environments as software drivers. These drivers are responsible for communicating to the hardware devices and operate at a privileged level in the operating system. Other software applications are precluded from affecting the drivers. However, because drivers are not protected from other drivers, a variety of problems can occur that might affect the operation of a driver, such as by corrupting its operation. These effects may be caused accidentally, or may be caused by purposeful hacking. A corrupted (or co-opted) driver might cause additional problems outside the computer, such as causing a phone line or wireless channel to be used, operating an external peripheral, or deleting important data.

Because the operating parameters of the physical layer, which control the operation of the transmitter of the mobile station, are controlled by the protocol layer using software, it may be possible for a computer program or virus to take control of the mobile station and cause it to accidentally or purposefully transmit outside of its assigned time slot. A wireless communications network, such as a cellular network, relies on a shared infrastructure. A mobile station must adhere to the 'rules of the road' or it may cause interference on the network.

If certain functions of the mobile station are controlled in software, a programmer may determine how the GSM control frames are decoded and how the transmitter module is triggered. A virus may then be written and spread over the network to infiltrate the software-based mobile stations. Then, on a particular time and date, the virus could take direct control of the mobile station and transmit continuously or intermittently and inundate the base stations and other mobile units with random frequencies and full power. Such a virus design could enable and disable at random times to avoid detection, robbing the air-time supplier of some or all of his available bandwidth and may even cause a complete shutdown of the network. Such an attack may take only a few affected devices (i.e., as few as one) per cell to disable the cell completely.

The security problems associated with mobile stations operating in a shared infrastructure may be segregated into three levels of severity: tamper-proof, non-tamperproof, and class break. First, a hardware/firmware implementation (such as a cell-phone) is the hardest with which to tamper, because each device must be acquired individually and modified (i.e., tamper-proof). On the other hand, a software-based solution is easier to tamper with, as a hacker can concentrate on a software-only debugger environment (i.e., non-tamper-proof). Finally, a system with the ability to be tampered with that is similar on all systems and allows the tampering to be distributed to a large number of systems of the same type is susceptible to a 'class-break.'

A software wireless modem is susceptible not only to a class-break, but also it is among those devices whose code may be accessed from the same layer as IP (internet protocol) or another portable code access mechanism. Many software wireless modems may be integrated into computers coupled to networks or the Internet. Such an arrangement increases the susceptibility of the software to being tampered with and controlled.

Communication devices implementing other communications protocols using software may also be susceptible to some of the problems identified above, but to differing degrees and levels of consequence. For example, software drivers for communication devices using copper subscriber lines, such voice band modems (V.90), asymmetric digital subscriber line (DSL) modems, home phone line networks (HomePNA), etc., may be attacked, resulting in the subscriber line being disabled or improperly used. For example, a group of infected software modems may be used in a denial of service attack to continuously place calls to a predetermined number and overwhelm the destination. The software modem could also be used to prevent outgoing or incoming calls on the subscriber line or disrupt HomePNA traffic. Other wireless communication devices implemented in software, such as wireless network devices, could also be commandeered to disrupt traffic on the wireless network.

The present invention is directed to overcoming, or at least reducing the effects of, one or more of the problems set forth above.

SUMMARY OF THE INVENTION

One aspect of the present invention is seen in a communications system including a physical layer hardware unit and a processing unit. The physical layer hardware unit is adapted to communicate data over a communications channel in accordance with assigned transmission parameters. The physical layer hardware unit is adapted to receive an incoming signal over the communications channel and sample the incoming signal to generate a digital received signal. The processing unit is adapted to execute a standard mode driver in a standard mode of operation and a privileged mode driver in a privileged mode of operation. The standard mode driver includes program instructions adapted to extract encrypted data from the digital received signal and pass the encrypted data to the privileged mode driver. The privileged mode driver includes program instructions adapted to decrypt the encrypted data to generate decrypted data including control codes and transfer the control codes to the physical layer hardware unit. The physical layer hardware is adapted to configure its assigned transmission parameters based on the control codes.

Another aspect of the present invention is seen in a method for configuring a transceiver. The method includes receiving encrypted data over a communications channel in a standard processing mode of a processing unit; transitioning the processing unit into a privileged processing mode; decrypting the encrypted data in the privileged processing mode; extracting control codes from the decrypted data in the privileged processing mode; and transmitting an upstream signal over the communications channel based on transmission assignments defined by the control codes.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
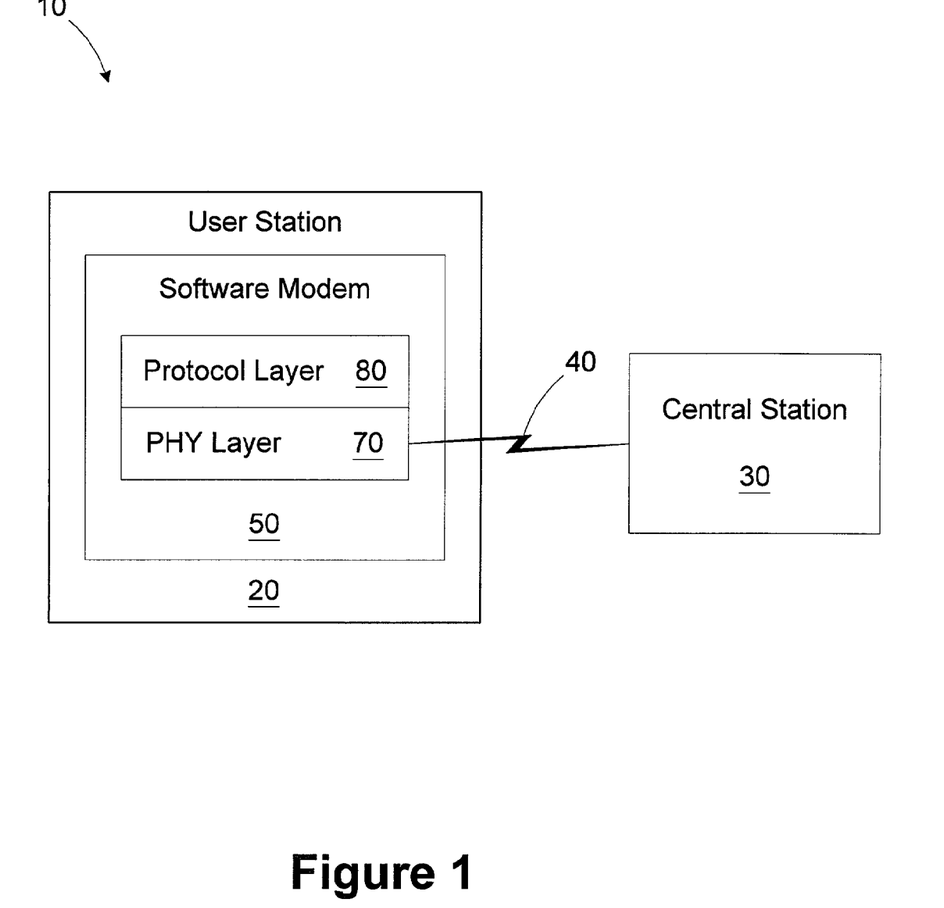
FIG. 1 is a simplified block diagram of a communications system in accordance with one illustrative embodiment of the present invention.

Referring to FIG. 1, a block diagram of a communications system 10 is provided. The communications system 10 includes a user station 20 in communication with a central station 30 over a communication channel 40. In the illustrated embodiment, the user station 20 is a mobile computing device using a software modem 50 to communicate in accordance with a wireless communication protocol, such as GSM. The central station 30 may be a shared base station capable of serving a plurality of subscribers. Although the invention is described as it may be implemented in a wireless environment, its application is not so limited. The teachings herein may be applied to other communication environments using software implemented communication protocols (e.g., V.90, ADSL, HomePNA, Wireless LAN, etc.).

The user station 20 may comprise a variety of computing devices, such as a desktop computer, a notebook computer, a personal data assistant (PDA), etc. For purposes of illustration, the user station 20 is described as it may be implemented using a notebook computer. The software modem 50 may be installed as an internal resource. As will be appreciated by those of ordinary skill in the art, the software modem 50 includes a physical layer (PHY) 70 implemented in hardware and a protocol layer 80 implemented in software. For purposes of illustration, the functions of the software modem 50 are described as they might be implemented for a GSM communication protocol, although other protocols may be used.

The PHY layer 70 converts digital transmit signals into an analog transmit waveform and converts an incoming analog received waveform into digital received signals. For transmit signals, the output of the protocol layer 80 is the transmit "on-air" information modulated about a zero Hz carrier (i.e., a carrierless signal). The PHY layer 70 mixes (i.e., mixing may also be referred to as upconverting) the carrierless transmit signal generated by the protocol layer 80 in accordance with assigned time slot, frequency, and power level assignments communicated to the user station 20 by the central station 30 to generate the actual analog waveform transmitted by the PHY layer 70.

The central station 30 also communicates time slot and frequency assignments to the user station 20 for incoming data. The incoming analog receive waveform is sampled and downconverted based on the assigned time slot and frequency parameters to recreate a carrierless (i.e., modulated about zero Hz) receive waveform. The protocol layer 80 receives the carrierless receive waveform from the PHY layer 70 and performs baseband processing, decryption, and decoding to regenerate the received data.

Collectively, the time slot, frequency, and power level (i.e., for transmit data only) assignments are referred to as control codes. The particular algorithms used for implementing the software modem 50 are described by the particular industry standards (e.g., GSM standards) and are well known to those of ordinary skill in the art, so for clarity and ease of illustration they are not detailed herein, except as they are modified in accordance with the present invention.

In the communications system 10 of the instant invention, the central station 30 transmits data in accordance with traditional GSM techniques. The data received by the protocol layer 80 is encrypted. As described in greater detail below, the protocol layer 80 functions are divided into privileged mode functions and standard mode functions. The privileged mode functions include decrypting the received data, extracting the control codes, sending the control codes to the PHY layer 70, and sending the user data to the standard mode. The standard mode functions include decoding the user data received from the privileged mode, encoding and encrypting outgoing user data for transmission, and generating the carrier-less transmit waveform for sending to the PHY layer 70 for transmission in accordance with the control codes. Such an arrangement prevents the standard mode software from being intentionally or accidentally corrupted and cause the software modem 50 to broadcast outside of its assigned time slot and frequency windows.

Figure 2:
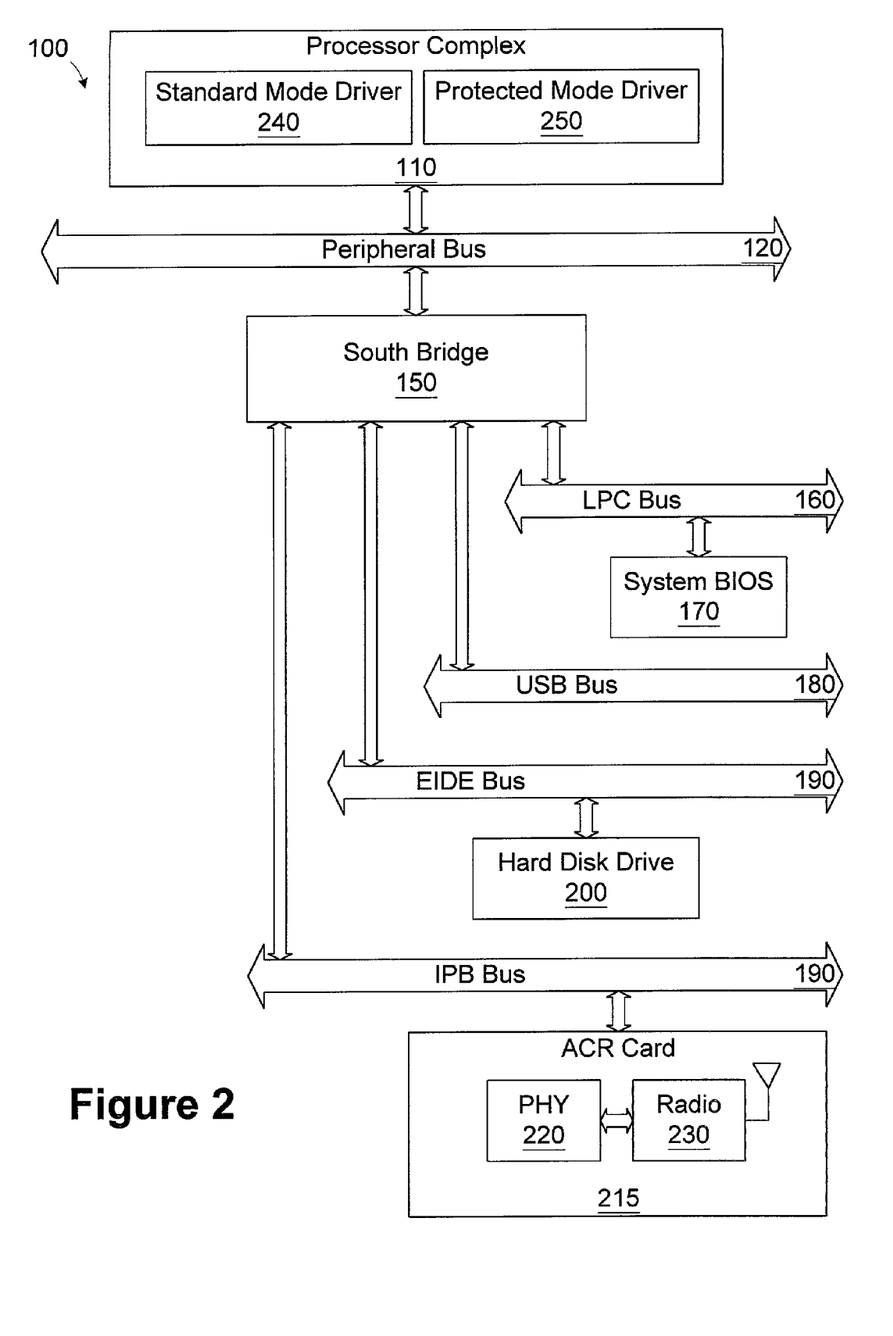
FIG. 2 is a simplified block diagram of an exemplary computer that embodies a user station in the communications system of FIG. 1.

Turning now to FIG. 2, a block diagram of the user station 20 embodied in a computer 100 is provided. The computer 100 includes a processor complex 110. For clarity and ease of understanding not all of the elements making up the processor complex 110 are described in detail. Such details are well known to those of ordinary skill in the art, and may vary based on the particular computer vendor and microprocessor type. Typically, the processor complex 110 includes a microprocessor, cache memories, system memory, a system bus, a graphics controller, and other devices, depending on the specific implementation.

The processor complex 110 has two modes of operation, a standard mode and a privileged mode. An exemplary privileged mode of operation, well known to those of ordinary skill in the art, is the System Management Mode (SMM). Entry into the SMM is initiated through a system management interrupt (SMI). In response to an SMI, the processor complex 110 executes SMM code previously loaded (i.e., during the initialization of the computer 100 and loading of the BIOS code) into a protected portion of the system memory not visible to any other processes (e.g., applications or drivers). The memory used to perform the functions of the processor complex 110 during the SMM event are also not apparent to any other process. Although the illustrative embodiment is described as it may be implemented using SMM as a privileged mode, the invention is not so limited, and a different type of privileged mode may be used. In general, a privileged mode is defined as a mode of operation not visible to other processes, such as applications or drivers, executing on the computer 100. SMM is simply one illustrative privileged mode currently available.

Other privileged contexts include the use of a separate processing entity, such as a cryptoprocessor, independent from the main system microprocessor. The functions of privileged mode software are executed by the cryptoprocessor and are thus secure from tampering by other software applications executing on the main system microprocessor. Still another privileged context is possible using a main system microprocessor having a secure architecture extension. In such an implementation, the cryptoprocessor is integrated into the main system microprocessor and controlled with secure commands.

The processor complex 110 is coupled to a peripheral bus 120, such as a peripheral component interface (PCI) bus. Typically a bridge unit (i.e., north bridge) in the processor complex 110 couples the system bus to the peripheral bus 120. A south bridge 150 is coupled to the peripheral bus 120. The south bridge 150 interfaces with a low pin count (LPC) bus 160 that hosts a system basic input output system (BIOS) memory 170, a universal serial bus (USB) 180 adapted to interface with a variety of peripherals (e.g., keyboard, mouse, printer, scanner, scanner) (not shown), an enhanced integrated drive electronics (EIDE) bus 190 for interfacing with a hard disk drive 200 and a CD-ROM drive (not shown), and an integrated packet bus (IPB) 210.

The IPB bus 210 hosts the hardware portion of the software modem 50. In the illustrated embodiment, the software modem 50 is hosted on an advanced communications riser (ACR) card 215. Specifications for the ACR card 215 and the IPB bus 210 are available from the ACR Special Interest Group (ACRSIG.ORG). The software modem 50 includes a PHY hardware unit 220 and a radio 230. In the illustrated embodiment, the radio 230 is adapted to transmit and receive GSM signals. Collectively, the PHY hardware unit 220 and the radio 230 form the PHY layer 70 (see FIG. 1).

The processor complex 110 executes program instructions encoded in a standard mode driver 240 and a privileged mode driver 250. The privileged mode driver 250 is loaded into the SMM space of the processor complex 110 during initialization of the computer 100. The privileged mode driver 250 may be stored in a secure location, such as the system BIOS 170, a secure memory device on the ACR card 215, a secure memory device in the computer 100, etc. An exemplary technique for storing a secure driver is described in U.S. patent application No. 09/901,176 (Attorney Docket No. 2000.053400/DIR, Client Docket No. TT4040), in the names of Terry L. Cole, David W. Smith, Rodney Schmidt, Geoffrey S. Strongin, Brian C. Barnes, and Michael Barclay, entitled, "PERIPHERAL DEVICE WITH SECURE DRIVER," and incorporated herein by reference in its entirety. Collectively, the processor complex 110 and the drivers 240, 250 implement the functions of the protocol layer 80 (see FIG. 1).

Figure 3:
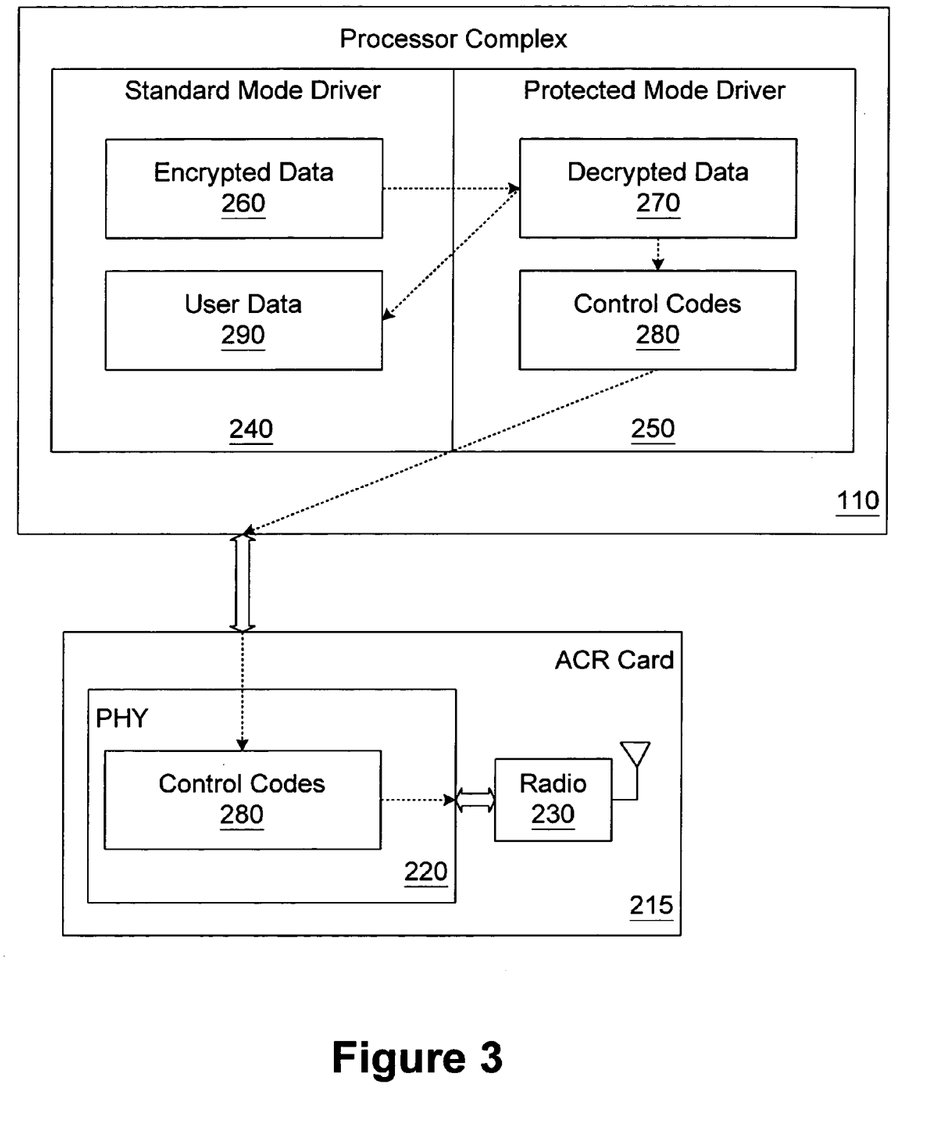
FIG. 3 is a simplified functional block diagram illustrating the interactions between the standard mode driver and the privileged mode driver in the computer of FIG. 2 in one particular embodiment of the present invention.

Turning now to FIG. 3, a simplified functional block diagram illustrating the interactions between the standard mode driver 240 and the privileged mode driver 250 in one particular embodiment of the present invention is shown. In the embodiment of FIG. 3, the privileged mode driver 250 is adapted to directly control the configuration of the PHY hardware 220 and the radio 230.

For incoming data received by the software modem 50, the standard mode driver 240 demodulates the carrier-less waveform to reconstruct encrypted data 260 received by the PHY hardware 220. The process for reconstructing the encrypted data 260 is well known to those of ordinary skill in the art, and is defined in industry GSM standards. For clarity and ease of illustration, the details of the reconstruction process are not included herein.

After reconstructing the encrypted data 260, the standard mode driver 240 calls the privileged mode driver 250 using an SMI. The processor complex 110 transitions to privileged mode (i.e., SMM) in response to the SMI and executes the privileged mode driver 250. Various techniques exist for passing the encrypted data 260 to the privileged mode driver 250. In one embodiment, the standard mode driver 240 passes a pointer indicating the memory location of the encrypted data 260. In another embodiment, a portion of the system memory is designated as a shared mailbox for privileged mode activities. Applications operating in the standard mode, such as the standard mode driver 240, may place data in a designated inbox of the shared memory space, and applications running in the privileged mode, such as the privileged mode driver 250, may place data in a designated outbox of the shared memory space. The outbox may be designated as read-only for standard mode applications. An exemplary computer system having a shared mailbox for passing data between standard mode and privileged mode applications is described in U.S. patent application Ser. No. 09/853,447, in the names of Dale E. Gulick and Geoffrey S. Strongin, entitled "INTEGRATED CIRCUIT FOR SECURITY AND MANAGEABILITY," and incorporated herein by reference in its entirety.

The privileged mode driver 250 decrypts the encrypted data 260 using the industry standard decryption techniques defined by the GSM standards to generate decrypted data 270. From the decrypted data 270, the privileged mode driver 250 extracts control codes 280 and/or user data 290. The user data 290 is passed back to the standard mode driver 240 (i.e., by pointer or shared mailbox) when the privileged mode driver 250 finishes its operations and the processor complex 110 exits the privileged mode.

The privileged mode driver 250 extracts the control codes 280 from the decrypted data 270 and sends the control codes 280 directly to the PHY hardware 220. In turn, the PHY hardware 220 configures the radio 230 based on the assigned time slot, frequency, and power level information contained in the control codes 280. The privileged mode driver 250 then ends its processing, and the processor complex 110 transitions back to standard mode operation. Because the privileged mode driver 250 is not visible to other processes running on the computer 100, it is not susceptible to being corrupted unintentionally or maliciously. Only the privileged mode driver 250 controls the configuration of the PHY hardware 220 and radio 230. Any tampering with the standard mode driver 240 will not be successful in allowing the radio 230 to be commandeered to cause the software modem 50 to broadcast outside of its assigned time slot and frequency windows. A virus could deleteriously affect the operation of the infected unit, but it could not cause the infected unit to interfere with other users of the communications system 10. In such a manner, a class-break fault having the potential to disrupt or disable the communication system 10 is avoided.

For data being transmitted by the software modem 50 the standard mode driver 240 handles all the data processing functions, including encoding, interleaving, burst assembly, encryption, and baseband processing to generate the carrierless transmit waveform. The standard mode driver 240 passes the transmit waveform to the PHY hardware 220 and radio 230 for upconverting in accordance with the assigned time slot, frequency, and power level previously extracted by the privileged mode driver 250 from the received data.

Figure 4:
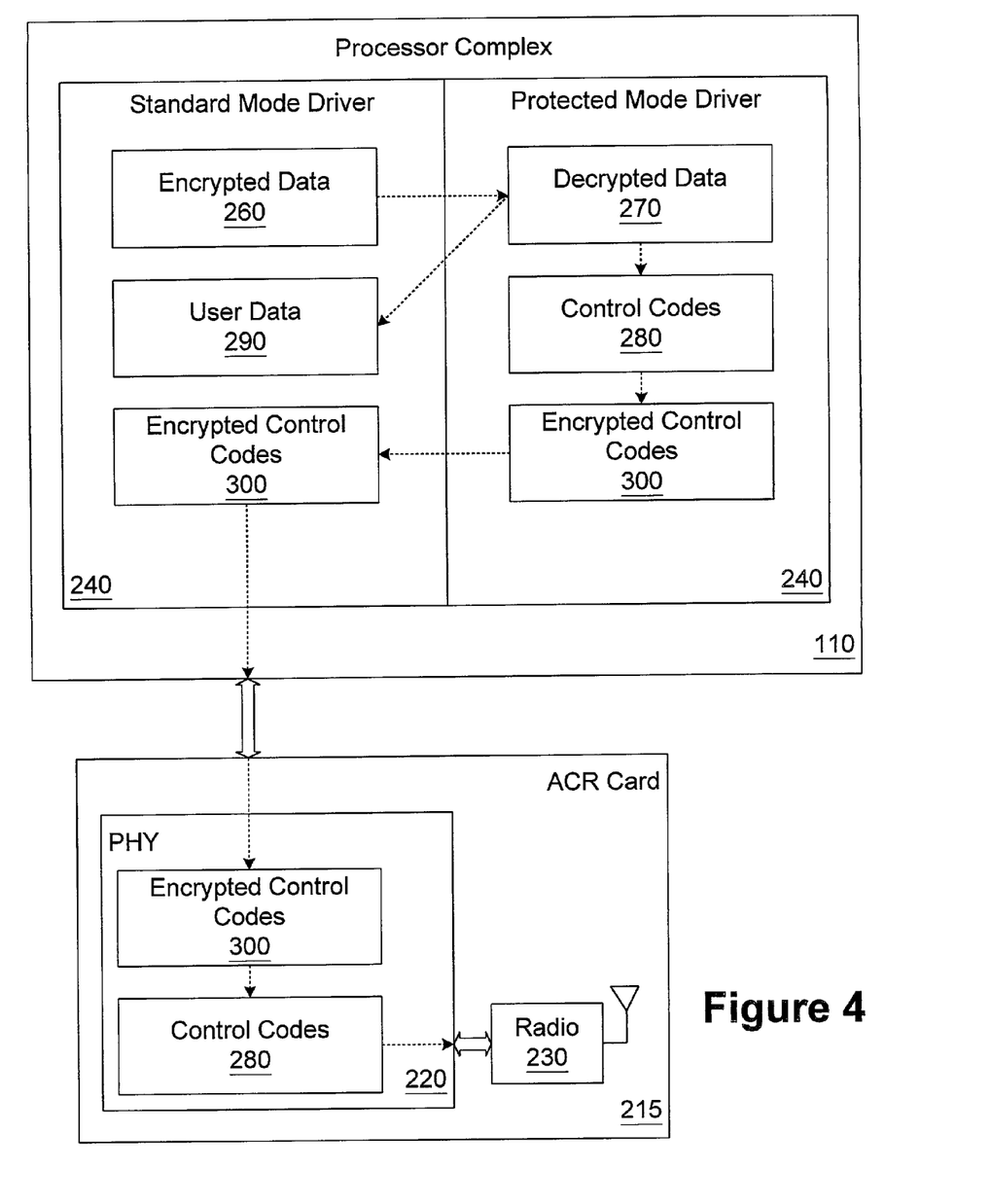
FIG. 4 is a simplified functional block diagram illustrating the interactions between the standard mode driver and the privileged mode driver in the computer of FIG. 2 in another particular embodiment of the present invention.

Referring now to FIG. 4, a simplified functional block diagram illustrating the interactions between the standard mode driver 240 and the privileged mode driver 250 in another particular embodiment of the present invention is shown. In the embodiment of FIG. 4, the privileged mode driver 250 does not directly control the configuration of the PHY hardware 220 and the radio 230, but rather, protects the control codes from tampering as they are being passed by the standard mode driver 240 to the PHY hardware 220.

The initial process of decrypting the encrypted data 260, extracting the control codes 280 and user data 290 from the decrypted data 270, and passing the user data 290 back to the standard mode driver 240 is the same as described above for the embodiment of FIG. 3. The functions of the standard mode driver 240 for generating the transmit waveform is also similar. Rather than sending the control codes 280 directly to the PHY hardware 220, the privileged mode driver 250 encrypts the control codes 280 to generate encrypted control codes 300, and sends the encrypted control codes 300 to the standard mode driver 240 (i.e., by passing a memory pointer to the location where the encrypted control codes 300 are stored or by placing the encrypted control codes 300 in a shared mailbox). The standard mode driver 240 sends the encrypted control codes 300 to the PHY hardware 220, which includes logic adapted to decrypt the encrypted control codes 300 and reconstruct the control codes 280. The reconstructed control codes 280 are then used to configure the radio 230 based on the assigned time slot, frequency, and power level information contained in the control codes 280.

The particular encryption schemed employed by the privileged mode driver 250 is implementation specific. One exemplary technique may involve generating the encrypted control codes 300 using a key defined by the vendor of the software modem 50 and stored in the system BIOS 170 along with the code for the privileged mode driver 250. The key may also be stored in a protected storage location on the ACR card 215 that is only accessible by the privileged mode driver 250. Because the content of the encrypted control codes 300 are not visible to the standard mode driver 240, a virus that has corrupted the standard mode driver 240 cannot affect the operation of the radio 230 by tampering with the control codes 280.

In either of the embodiments described in FIGS. 3 and 4, the standard mode driver 240 cannot be maliciously commandeered to intercept or change the control codes 280 and co-opt the radio 230. Extracting the control codes 280 in a privileged mode setting enhances the security of the software modem 50 without sacrificing the flexibility and adaptability features inherent in its software implementation. In both cases, the privileged mode driver 250 transfers the control codes 280 to the PHY hardware 220. In the embodiment of FIG. 3, the privileged mode driver 250 transfers the control codes 280 directly, and in the embodiment of FIG. 4, the privileged mode driver 250 transfers the control codes 280 indirectly by encrypting the control codes 280 and transferring the encrypted control codes 300 through the standard mode driver 240.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A communications system, comprising:
a physical layer hardware unit adapted to communicate data over a communications channel in accordance with assigned transmission parameters, the physical layer hardware unit being adapted to receive an incoming signal over the communications channel and sample the incoming signal to generate a digital received signal; and
a processing unit adapted to execute a standard mode driver in a standard mode of operation and a privileged mode driver in a privileged mode of operation, wherein the standard mode driver includes program instructions adapted to extract encrypted data from the digital received signal and pass the encrypted data to the privileged mode driver, and the privileged mode driver includes program instructions adapted to decrypt the encrypted data to generate decrypted data including control codes and transfer the control codes to the physical layer hardware unit, the physical layer hardware being adapted to configure its assigned transmission parameters based on the control codes.

2. The system of claim 1, wherein the control codes include at least one of a power level assignment, a frequency assignment, and a time slot assignment.

3. The system of claim 1, wherein the privileged mode of operation comprises a system management mode of operation.

4. The system of claim 1, wherein the standard mode driver includes program instructions adapted to issue a signal to the processing unit to initiate a change from the standard mode of operation to the privileged mode of operation.

5. The system of claim 4, wherein the signal comprises a system management interrupt.

6. The system of claim 1, wherein the processing unit includes a memory device adapted to store the encrypted data, and the standard mode driver includes program instructions adapted to pass a pointer indicating a location of the encrypted data within the memory device to the privileged mode driver.

7. The system of claim 1, wherein the privileged mode driver includes program instructions adapted to extract user data from the decrypted data and pass the user data to the standard mode driver.

8. The system of claim 7, wherein the processing unit includes a memory device adapted to store the user data, and the privileged mode driver includes program instructions adapted to pass a pointer indicating a location of the user data within the memory device to the standard mode driver.

9. The system of claim 1, wherein the privileged mode driver include program instructions adapted to encrypt the control codes and pass the encrypted control codes to the standard mode driver, the standard mode driver includes instructions adapted to send the encrypted control codes to the physical layer hardware unit, and the physical layer hardware unit is adapted to decrypt the encrypted control codes to reconstruct the control codes.

10. The system of claim 1, wherein the privileged mode driver includes instructions adapted to transfer the control codes directly to the physical layer hardware unit.

11. The system of claim 1, wherein the processing unit comprises a computer.

12. The system of claim 11, wherein the computer includes:
   a processor complex adapted to execute the program instructions in the standard mode driver and the privileged mode driver;
   a bus coupled to the processor complex; and
   an expansion card coupled to the bus, the expansion card including the physical layer hardware.

13. The system of claim 1, wherein the processing unit includes a system basic input output system (BIOS) memory adapted to store the privileged mode driver.

14. The system of claim 13, wherein the processing unit is adapted to load the privileged mode driver from the system BIOS into a protected memory location during initialization of the computer.

15. A method for configuring a transceiver, comprising:
   receiving encrypted data over a communications channel in a standard processing mode of a processing unit;
   transitioning the processing unit into a privileged processing mode;
   decrypting the encrypted data in the privileged processing mode;
   extracting control codes from the decrypted data in the privileged processing mode; and
   transmitting an upstream signal over the communications channel based on transmission assignments defined by the control codes.

16. The method of claim 15, wherein transmitting the upstream signal comprises transmitting the upstream signal based on at least one of a power level assignment, a frequency assignment, and a time slot assignment.

17. The method of claim 15, wherein transitioning the processing unit into the privileged processing mode comprises a transitioning the processing unit into a system management mode of operation.

18. The method of claim 15, wherein transitioning the processing unit into the privileged processing mode comprises initiating a system management interrupt.

19. The method of claim 15, further comprising specifing a pointer indicating a location of the encrypted data within a memory device of the processing unit.

20. The method of claim 15, further comprising sending the control codes to a communications device adapted to transmit the upstream signal in the privileged processing mode.

21. The method of claim 15, further comprising:
   encrypting the control codes in the privileged processing mode;
   transitioning the processing unit into the standard processing mode; and
   sending the encrypted control codes to a physical layer device adapted to transmit the upstream signal in the standard processing mode.

22. The method of claim 21, further comprising:
   decrypting the encrypted control codes in the physical layer device; and
   configuring the physical layer device based on the control codes.

23. The method of claim 15, further comprising:
   extracting user data from the decrypted data in the privileged processing mode;
   transitioning the processing unit into the standard processing mode; and
   processing the user data in the standard processing mode.

24. The method of claim 23, further comprising specifying a pointer indicating a location of the user data within a memory device of the processing unit.

25. A modem, comprising:
   means for receiving encrypted data over a communications channel in a standard processing mode of a processing unit;
   means for transitioning the processing unit into a privileged processing mode;
   means for decrypting the encrypted data in the privileged processing mode;
   means for extracting control codes from the decrypted data in the privileged processing mode; and
   means for transmitting an upstream signal over the communications channel based on transmission assignments defined by the control codes.

* * * * *